United States Patent [19]

Slawsby

[11] 4,084,158
[45] Apr. 11, 1978

[54] METHOD OF OPERATING SYNTHETIC APERTURE RADAR

[75] Inventor: Nathan Slawsby, Canton, Mass.

[73] Assignee: Raytheon Company, Lexington, Mass.

[21] Appl. No.: 756,455

[22] Filed: Jan. 3, 1977

[51] Int. Cl.² ............................................. G01S 9/02
[52] U.S. Cl. .......................... 343/5 CM; 343/5 DP; 343/17.1 PF
[58] Field of Search .......... 343/5 CM, 5 DP, 17.1 PF

[56] References Cited

U.S. PATENT DOCUMENTS

| | | | |
|---|---|---|---|
| 3,341,847 | 9/1967 | Fried et al. | 343/17.1 PF |
| 3,737,900 | 6/1973 | Vehrs, Jr. | 343/5 CM X |
| 3,768,096 | 10/1973 | Dentino | 343/5 CM X |
| 3,787,848 | 1/1974 | Laundry et al. | 343/17.1 PF X |
| 3,987,285 | 10/1976 | Perry | 343/5 DP X |
| 4,034,370 | 7/1977 | Mims | 343/5 CM |

Primary Examiner—S. C. Buczinski
Attorney, Agent, or Firm—Philip J. McFarland; Joseph D. Pannone

[57] ABSTRACT

A method, and apparatus for performing the method, of compensating for the effects of Doppler accelerations due to the orientation of the beam in a squinted synthetic aperture radar used for mapping terrain underlying an aircraft are described. According to the disclosed method, compensation is achieved by calculating the Doppler frequency shifts to be experienced by echo signals from points on the terrain to be mapped and then, in accordance with such calculations, varying the pulse repetition frequency of the squinted synthetic aperture radar to eliminate the effects of Doppler acceleration from the echo signals.

2 Claims, 4 Drawing Figures

METHOD OF OPERATING SYNTHETIC APERTURE RADAR

BACKGROUND OF THE INVENTION

This invention pertains generally to mapping systems using a synthetic aperture in an aircraft and particularly to any system of such type wherein the synthetic aperture radar is operated following so-called focused synthetic aperture techniques.

It is known that systems including synthetic aperture radar carried in an aircraft (such as the system described in the article entitled "Performance of a Synthetic Aperture Mapping Radar System," by J. A. Develet, Jr., IEEE Transactions on Aerospace and Navigational Electronics, September 1964, pp. 173-179) may be used to generate a radar map having a resolution equivalent to the resolution of a photograph. Briefly, the system described in the just-cited article is arranged first to record, on photographic film, images representative of the time history of the echo signals from a swath of the terrain underlying an aircraft carrying a synthetic aperture radar and then, using an optical signal processor, to process the images on the photographic film in order to generate the desired radar map of the swath of the underlying terrain.

Although the just-outlined system for generating a radar map is adequate in many operational situations, there are various tactical situations encountered by the military (such as situations involving weapon delivery or damage assessment) wherein a system of such type is unsatisfactory. The relatively long processing time inherent in the use of photographic equipment is intolerable in such tactical situations wherein decisions must be made as soon as information is available.

In known systems designed to reduce processing time to a minimum so that a radar map may be generated in "real-time" various well known digital processing techniques have been adapted to the problem of converting echo signals from a synthetic aperture radar to a radar map for display on a viewing screen in a device such as a cathode ray tube. With any digital processing technique adapted to produce a radar map in "real-time" on board an aircraft, practical considerations, such as weight, size and complexity, are limitations on the amount of digital processing equipment dedicated to the function of map making. On the other hand, however, if a radar map is to be generated in "real-time" from radar echo signals out of any known synthetic aperture radar, the amount of information which must be processed to generate a radar map having satisfactory resolution is extremely great. The capacity of the digital processor used must, perforce, be correspondingly great, especially if the resolution possible with a focused synthetic aperture radar is to be attained.

The capacity of a digital processor used to process information for a radar map must, according to the prior art, be greater when synthetic aperture radar is operated in a "squinted" mode rather than a "broadside" mode. In the latter mode, the centerline of the beam of the synthetic aperture radar is maintained in the vertical plane orthogonal to the course line of the aircraft carrying such radar; in the former mode, the centerline of such beam is maintained in a vertical plane to which such course line is inclined at an acute angle, say in the order of 45°. The orientation of the beam in the broadside mode of operation results, for almost all practical cases, in the reduction of the effects of Doppler acceleration due to relative motion between the aircraft and any selected point within the area being mapped to an insignificant degree. On the other hand, however, the effects of Doppler acceleration due to relative motion between the aircraft and any selected point within the area being mapped cannot be ignored in the squint mode if an appreciable area is to be mapped.

SUMMARY OF THE INVENTION

With the background of the art in mind, it is a primary object of this invention to provide an improved radar mapping system operating in real time wherein a synthetic aperture radar is operated in a squint mode without producing information which must be corrected in an associated digital processor to eliminate the effects of Doppler acceleration.

Another object of this invention is to provide an improved radar mapping system wherein a synthetic aperture radar is operated in a squint mode without limiting, to any practical degree, the area to be mapped.

Yet another object of this invention is to provide an improved radar mapping system wherein an aircraft carrying a synthetic aperture radar is not restricted to a tightly prescribed course.

These and other objects of this invention are attained in a preferred embodiment of a radar mapping system by changing the pulse repetition frequency of a synthetic aperture radar (operated in a squint mode) during each one of the information gathering intervals prerequisite to the generation of a desired radar map. In particular, the pulse repetition frequency of the synthetic aperture radar is changed in a programmed manner so that the effect of any Doppler acceleration between the aircraft carrying the synthetic aperture radar and points within the area to be mapped is, for almost any practical purpose, eliminated from the information processed in a digital processor. The result, then, is that such processor need not be provided with the capacity to compensate for such Doppler acceleration effect when generating a radar map of an appreciable area.

BRIEF DESCRIPTION OF THE DRAWINGS

For a more complete understanding of this invention, reference is now made to the following description of the accompanying drawings, wherein.

DESCRIPTION OF THE PREFERRED EMBODIMENTS

Figure 1:
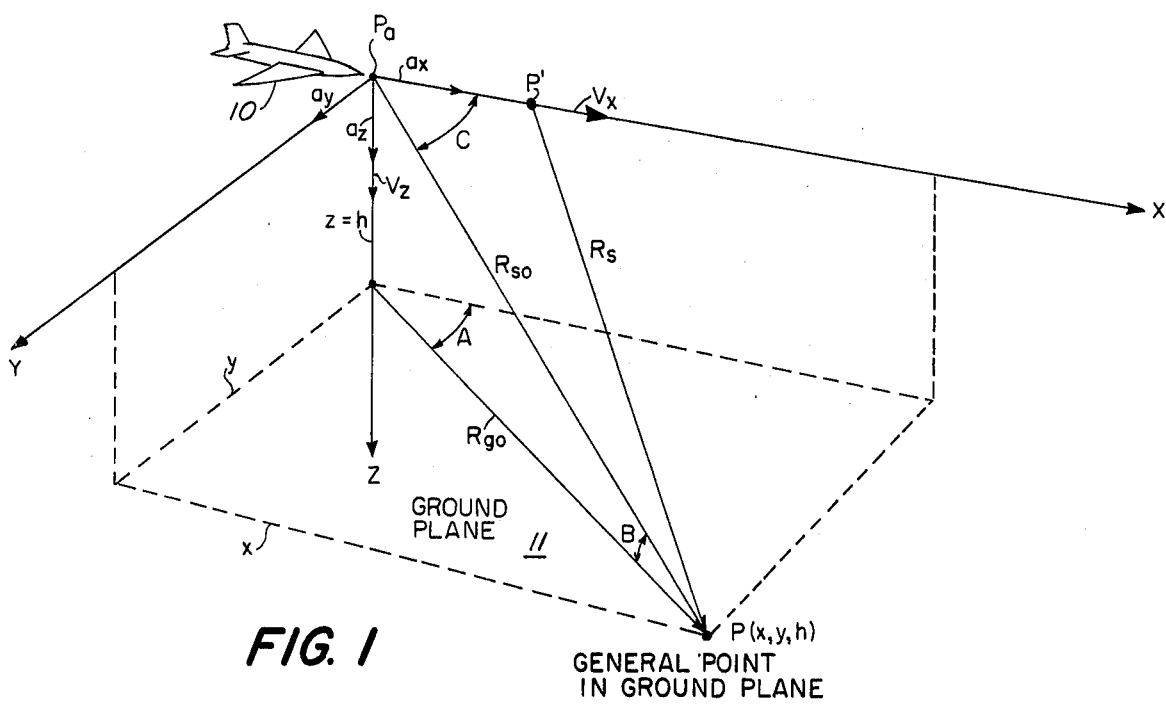
FIG. 1 is a sketch, greatly simplified for expository reasons, showing the geometrical relationship between an aircraft and the underlying terrain in a ground mapping operation as here contemplated.
Figure 3:
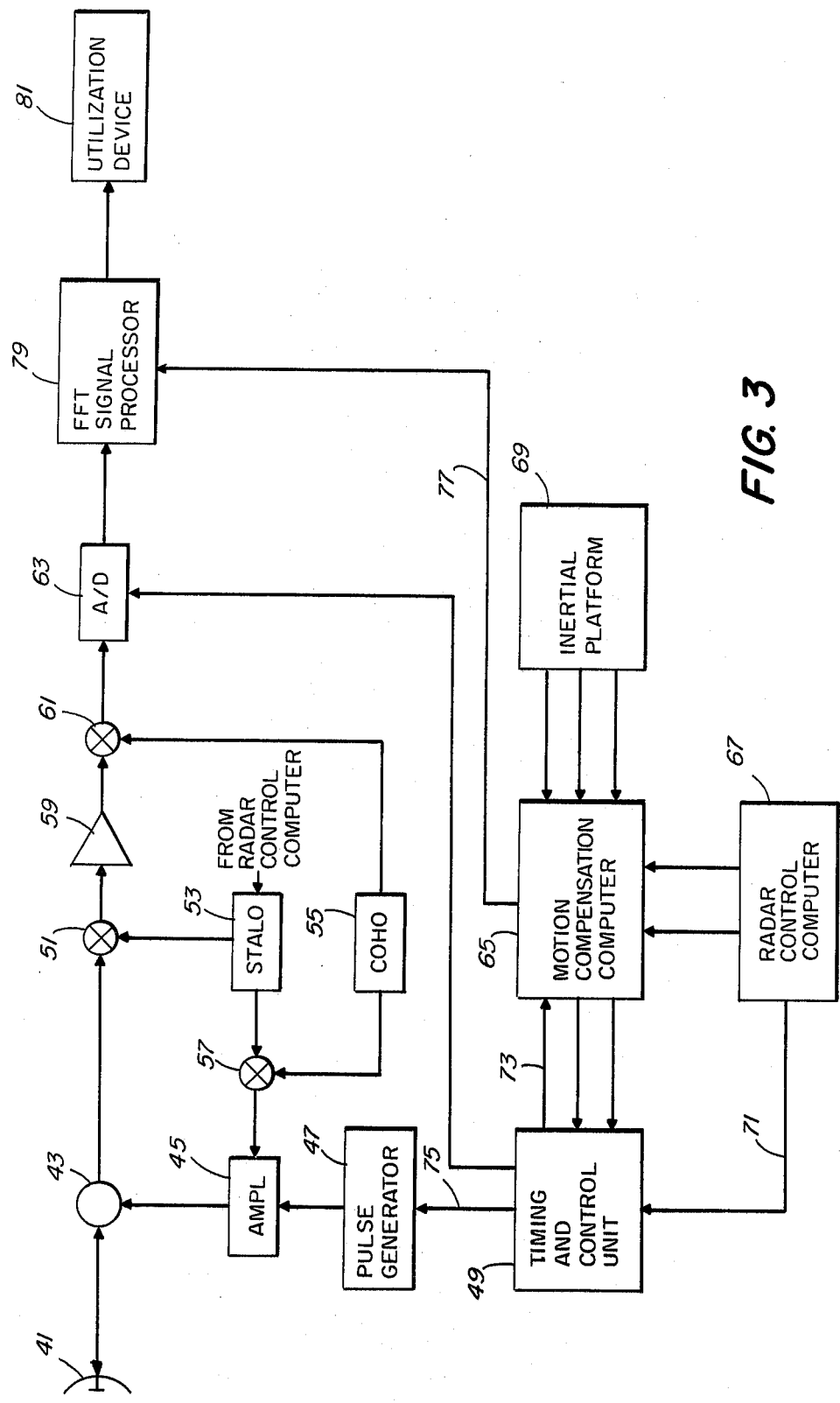
FIG. 3 is a block diagram of a system embodying the concept of the invention to implement the idea of changing, in a programmed manner, the pulse repetition frequency of a synthetic aperture radar operated in a squinted mode to compensate for Doppler acceleration.

A mathematical explanation, based on the geometry shown in FIG. 1 and the changes in such geometry with the passage of time, will now be undertaken to show why defocusing occurs and, at the same time, to lead into an explanation of the contemplated arrangement shown in FIG. 3 to compensate for such effect. Thus, referring to FIG. 1, it may be seen that the slant range, $R_s$, between the aircraft 10 and any point P $(x, y, h)$ on ground plane 11 may be expressed as:

Equation (1)

$$R_s = [(x - v_x t - a_x t/2)^2 + (y - a_y t/2)^2 + (z - v_z t - a_z t/2)^2]^{\frac{1}{2}}$$

where $z = h$, "$t$" is the interval of time taken for the aircraft 10 to move between positions $P_o$ and $P'$ and the other factors are as indicated in FIG. 1.

The right hand side of Equation (1) may be expanded in a Taylor series about $t = 0$ to allow the second derivative of Equation (1) to be evaluated at $t = 0$. Thus:

Equation (2)

$$R_s = R_{so} - (V_x \cos A \cos B + V_z \sin B)t + V_x^2 t^2 (1 - \cos^2 A \cos^2 B)/2R_{so} + V_z^2 t^2 (\cos^2 B)/2R_{so} - V_x V_z t^2 (\cos A \sin B \cos B)/R_{so} - t^2(a_x \cos A \cos B + a_y \sin A \cos B + a_z \sin B)/2$$

where $R_{so}$ is the slant range to the point P $(x, y, h)$ when $t = 0$ and the other factors are as shown in FIG. 1.

Equation (2) describes, taking the point $P_o$ as the origin, how the slant range varies during any data gathering interval. Remembering that slant range at any instant in time may be expressed as a phase shift between transmitted and received signals in a radar and that the first derivative (with respect to time) of a phase shift is frequency, the Doppler shift, $f_d$, during any data gathering interval is:

Equation (3)

$$f_d = 2\{ - [V_x \cos A \cos B + V_z \sin B] + t[V_x^2(1 - \cos^2 A \cos^2 B) + V_z^2 \cos^2 B - 2V_x V_z \cos A \sin B \cos B]/R_{so} - t[a_x \cos A \cos B - a_y \sin A \cos B - a_z \sin B]\}/L$$

where L is the wavelength of the transmitted signals.

From Equation (3) it may be seen that the Doppler frequency history of the echo signals from any point on the ground plane 11 during any data gathering interval is a function of the horizontal velocity, $V_x$, and the vertical velocity, $V_z$, of the aircraft and the angles A and B, the accelerations $a_x$, $a_y$ and $a_z$, the slant range, $R_{so}$, and of time. Because the difference between the Doppler frequency of the echo signals from points on the ground plane 11 at the same slant range is not solely dependent upon the angles A and B, the azimuthal position of any given point cannot be accurately determined using the same digital processing techniques as when a broadside mode of operation is followed. That is to say, if the azimuthal position of any given point is to be determined by assuming that the Doppler frequency of echo signals from any given point on the ground plane 11 varies linearly with time at a rate which is independent of azimuth (as may be assumed for the echo signals in a sidelooking synthetic aperture radar), then the actually experienced azimuthal variation in the rate of change of the Doppler frequency of the echo signals in a squinted synthetic aperture radar causes degradation, i.e., defocussing, of the quality of the generated radar map.

Figure 2A:
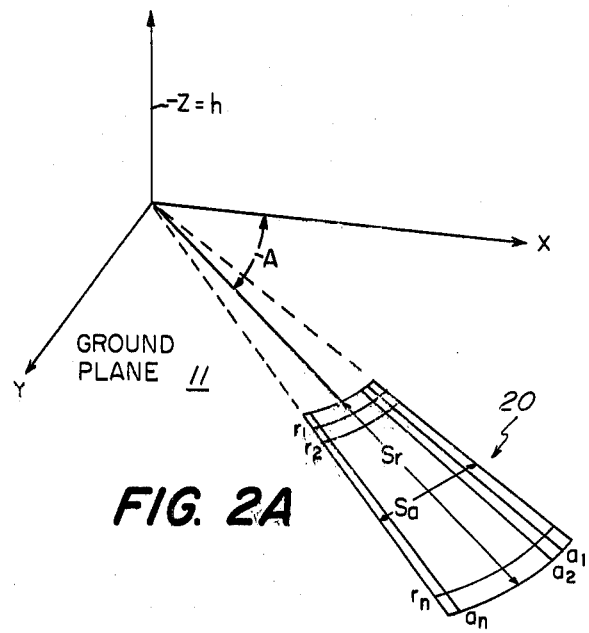
FIG. 2A is a sketch, again greatly simplified, illustrating a portion of the terrain illuminated by a beam from a radar on board the aircraft of FIG. 1.

Referring now to FIG. 2A, the region 20 on ground plane 11 mapped by the radar is shown. The linear dimensions of region 20 in the range and azimuth directions are denoted by $S_r$ and $S_a$, respectively, and the map resolution cells are designated by indices $r_m$ and $a_n$.

Figure 2B:
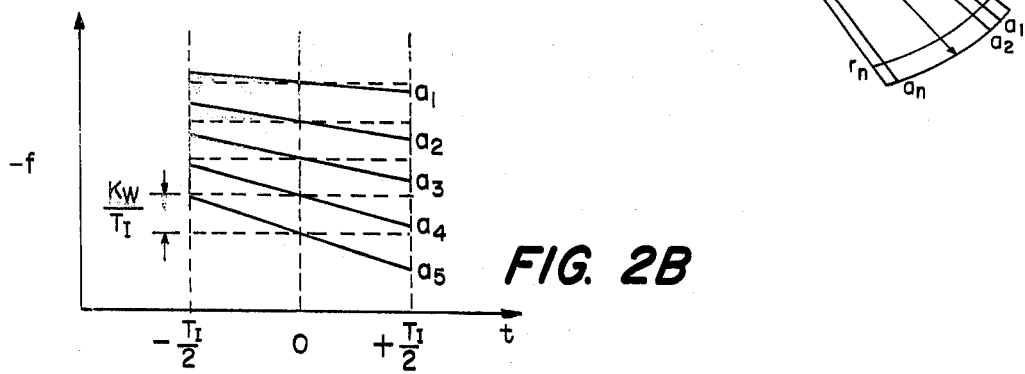
FIG. 2B is, still again, a simplified sketch illustrating the Doppler frequency response of a number of unfocussed azimuth cells corresponding to portions of a radar generated map.

Referring to FIG. 2B, a set of idealized frequency histories (not numbered) of points which occupy the same range cell but different azimuth cells $a_1 \ldots a_5$ are shown as a family of straight lines (not numbered) limited in the time dimension to the region $-T_I/2 \leq t \leq T_I/2$, where $T_I$ is the aperture integration time. The nominal Doppler resolution associated with a waveform of this duration is $1/T_I$. All practical radar systems, however, modulate the signal received during the dwell with an amplitude weighting function in order to reduce the frequency sidelobes of the processor output, and this degrades the available frequency resolution. The degradation factor is denoted here by $K_w$ and its value depends upon the type of weighting employed. Since the resolution cell width is $K_w/T_I$, the frequency characteristics of adjacent azimuth resolution cells should be offset from each other by this amount. As shown, however, this is the case only at time $t = 0$, for the frequency slope in azimuth cells $a_1 \ldots a_5$ varies as a function of the cell position. As explained hereinabove, this is the phenomenon which produces azimuth defocusing. The mechanism by which this defocusing occurs will be explained in greater detail hereinbelow.

The azimuthal rate of change in the Doppler frequencies of the echo signals from any given point on the ground plane 11 (with $P_o$ taken to be the position of the antenna of the radar on the aircraft 10) is found by differentiating Equation (3) with respect to A. This yields:

Equation (4)

$$2f_d/2A = -2 \cos B \{V_x \sin A + t[2 \sin A(V_x^2 \cos A \cos B + V_x V_z \sin B)/R_{so} + a_x \sin A - a_y \cos A]\}/L$$

For standard synthetic aperture operation in the broadside mode, $$V_z = a_x = a_y = 0$$

$$A = 90°$$

Inserting these conditions into Equation (4), we obtain:

Equation (5)

Broadside Mode: $2f_d/2A = -2V_x(\cos B)/L$

The fact that Equation (5) is independent of time while Equation (4) has a linear time dependence constitutes the principal difference between the broadside and the squint modes of synthetic aperture operation. It is apparent from Equation (4) that the time dependence could also be removed for the squint mode if the horizontal velocity, $V_x$, of the aircraft 10 could be properly controlled. That is to say, the course of the aircraft 10 (or its speed) could be changed to produce accelerations (with respect to any point on the ground plane 11) which would, in turn, cause a corresponding change in the rate of change of the Doppler frequency. In theory at least, then, the aircraft 10 could be flown on a curvilinear path with the pulse repetition frequency of the radar held constant to reduce the undesirable acceleration components (and the resulting slope variations in the Doppler frequency histories of echo signals).

According to my concepts, however, the effect of the undesirable acceleration components (and the resulting slope variations in the Doppler frequency histories of echo signals) may be reduced without requiring any velocity changes. Thus, as shown in FIG. 3, a coherent pulse Doppler radar system is shown, such system being suitable for use in a synthetic aperture radar application wherein real time signal processing is desired. The radar transmitter/receiver section (not numbered) of such radar system includes an antenna 41 coupled through circulator 43 to an amplifier 45 (here a Klystron), pulse generator 47 and timing and control unit 49 in a conventional manner whereby a train of pulses of radio frequency (RF) energy is transmitted at a desired PRF. Each one of the pulses in the train of transmitted pulses is reflected by various objects which are dispersed over various ranges from antenna 41. A portion of the reflected energy produced in response to each transmitted pulse is received by antenna 41. The energy received by antenna 41 passes through circulator 43. The signal at the output of circulator 43 is heterodyned in a conventional manner in mixer 51 with a signal produced by stable local oscillator (STALO 53). The signal produced by STALO 53 is heterodyned with a signal produced by a coherent oscillator (COHO 55) in mixer 57 to produce a signal which is amplified by amplifier 45 in a conventional manner. The signal produced at the output of mixer 51 is passed through IF amplifier 59 to phase detector 61. Phase detector 61 responds in a conventional manner to the signal produced by COHO 55 whereby the output from phase detector 61 is a video frequency signal. The video frequency signal is digitized by A/D converter 63 in response to control signals supplied to A/D converter 63 by timing and control unit 49. Before proceeding, it is noted that the logic circuitry required for producing the timing and control signals as well as the operation of the various computers and processors are matters involving ordinary skill in the art and will therefore not be described in detail.

Timing and control unit 49 as well as motion compensation computer 65 are under the control of radar control computer 67. Radar control computer 67 accepts input data, such as the desired azimuth resolution of the map and the frequencies to be used in the mapping process, from an operator. It is noted in passing that oftentimes it is desirable to employ more than one frequency in the radar mapping process in order to prevent the "smearing" of objects resulting from phase errors occurring at a single frequency. Radar control computer 67 converts the desired frequencies to equivalent analog voltages which are used to control the frequency of STALO 53.

Motion compensation computer 65 periodically samples inertial platform 69, which is of conventional design, to determine the aircraft attitude prior to the start of a radar dwell. Motion compensation computer 65 first performs a matrix multiplication to transform the data obtained from inertial platform 69 from "velocity" space coordinates into "reference" space coordinates, and then calculates the values of synthetic deceleration, as will be explained in greater detail hereinafter, required for the dwell and generates a set of spatial positions at which pulses will be transmitted. Radar control computer 67 sends a dwell start command on line 71 to timing and control unit 49. Timing and control unit 49 sends a transmission time word via line 73 to motion compensation computer 65 and simultaneously provides a trigger pulse on line 75 to pulse generator 47. Motion compensation computer 65 upon receipt of the transmission time word initializes a register in which the aircraft position obtained from inertial platform 69 is stored.

The time to go for the next pulse is then computed based upon the previously computed spatial positions and current estimates of along track velocity and acceleration obtained from inertial platform 69. The time to go word is sent to timing and control unit 49 wherein it is stored and continually compared with the contents of a clock pulse counter and, when the two are equal, the next transmission time word and trigger pulse are produced.

For each transmitted pulse, the motion compensation computer 65 computes the incremental range slip experienced by the map center since the start of the dwell. This number is encoded in the form of an equivalent number of high frequency clock pulses and is sent to timing and control unit 49 wherein it is used to control the time at which the first strobe pulse is sent to A/D converter 63. Motion compensation computer 65 uses the incremental range slip number to calculate a phase rotation multiplier for each pulse which will provide range focusing for the map center. The phase rotation multipliers are sent via line 77 to FFT signal processor 79 wherein they are used to rotate the phase of each return pulse by the required amount prior to FFT processing. The data from FFT signal processor 79 is sent to utilization device 81 which is here a conventional display unit.

The just-described system is effective in maintaining the generated maps in focus even under the effect of aircraft accelerations. Equation (4) expresses the rate of change of Doppler frequency with azimuth for general squint mode conditions, including three acceleration components and vertical as well as horizontal velocity. To reduce this to the form of Equation (5), which holds only for ideal broadside operation, it is necessary to reduce the coefficient of $t$ in Equation (4) to zero. Since this coefficient is a sum of terms, sets of parameter values must exist for which the terms will sum to zero. If a controlled, synthetically generated acceleration is added to the actual along track acceleration, $a_x$, of such magnitude as to insure that this condition is met, its value would be given by Equation (6).

Equation (6)

$$A_{syn} = \frac{-2V^2}{R_{so}} \cos A \cos B - \frac{2V_x V_z}{R_{so}} \sin B - a_x a_y \operatorname{ctn} A$$

From the foregoing, it is apparent that the focal width of this synthetic aperture is a function of geometry, and that the location of the ground points being mapped and the points on the synthetic aperture at which transmission takes place completely specifies the focal quality of the generated maps. Further, it is apparent that a radar with a constant PRF carried by an aircraft moving along a straight line at constant velocity will produce pulse transmissions at points equally spaced along its line of flight. If a deceleration of the value given by Equation (6) is introduced with the radar still operating at constant PRF, the spacing between pulse transmission locations will decrease linearly across the synthetic aperture. This change of the distance between pulse transmission points is the only effect which aircraft deceleration produces on mapping geometry and, therefore, is the underlying cause of the improvement in focal width. Since this is the case, any mechanism which produces the same spacing between pulse transmission points will produce the desired effect. Motion compensation computer 65 calculates the values of synthetic deceleration given by Equation (6) and using these values calculates the spatial positions at which pulses will be transmitted.

Having described a preferred embodiment of this invention, it will be apparent to one of skill in the art that many changes and modifications may be made without departing from my inventive concepts. For example, a phased array may be used in place of the antenna of FIG. 3, in which case a beam steering computer would be used to control the position of the radar beam relative to the center of the mapped region. It is felt, therefore, that this invention should not be restricted to its disclosed embodiments, but rather should be limited only by the spirit and scope of the appended claims.

What is claimed is:

1. An airborne coherent pulse Doppler radar including a Fast Fourier Transform signal processor adapted for use in an aircraft for the generation of real-time high resolution ground map imagery using synthetic aperture techniques, such radar comprising:

(a) means for monitoring the attitude of said aircraft;
   (b) a motion compensation computer responsive to the velocity of the aircraft and the pulse repetition frequency of the radar for the generation of phase multipliers used by said processor to maintain the data from said radar in range focus; and,
   (c) means, responsive to said motion compensation computer, for varying the pulse repetition frequency of the radar to maintain the data from said radar in azimuth focus.

2. In an airborne coherent side-looking radar having a Fast Fourier Transform signal processor for the generation of real-time high resolution ground map imagery by means of synthetic aperture techniques, and including compensatory phase shift means responsive to the aircraft velocity and the pulse repetition frequency of the radar for maintaining the data from the radar receiver in range focus, the improvement comprising means for varying, in a predetermined manner, the pulse repetition frequency of the radar to maintain the data from the radar receiver in azimuth focus.

* * * * *